United States Patent
Vijaya Kumar et al.

(10) Patent No.: US 11,626,015 B2
(45) Date of Patent: Apr. 11, 2023

(54) VEHICLE SYSTEM USING VEHICLE-TO-INFRASTRUCTURE AND SENSOR INFORMATION

(71) Applicant: GM GLOBAL TECHNOLOGY OPERATIONS LLC, Detroit, MI (US)

(72) Inventors: Vivek Vijaya Kumar, Shelby Township, MI (US); Hariharan Krishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 410 days.

(21) Appl. No.: 16/351,881

(22) Filed: Mar. 13, 2019

(65) Prior Publication Data
US 2019/0213879 A1  Jul. 11, 2019

Related U.S. Application Data

(62) Division of application No. 15/387,763, filed on Dec. 22, 2016, now Pat. No. 10,276,043.

(51) Int. Cl.
G08G 1/0962 (2006.01)
G06V 20/58 (2022.01)
G08G 1/01 (2006.01)

(52) U.S. Cl.
CPC ......... *G08G 1/09623* (2013.01); *G06V 20/58* (2022.01); *G08G 1/0112* (2013.01); *G08G 1/0116* (2013.01)

(58) Field of Classification Search
CPC ............. G08G 1/09623; G08G 1/0112; G08G 1/0116; G06K 9/00805
USPC .......................................................... 701/117
See application file for complete search history.

(56) References Cited

U.S. PATENT DOCUMENTS

| | | | |
|---|---|---|---|
| 2013/0253754 A1* | 9/2013 | Ferguson | G06V 20/584 701/28 |
| 2014/0119605 A1* | 5/2014 | Zobel | G08G 1/09623 382/103 |
| 2014/0140353 A1* | 5/2014 | Stahlin | H04L 45/3065 370/419 |
| 2014/0277986 A1* | 9/2014 | Mahler | G08G 1/0116 701/1 |
| 2015/0012172 A1* | 1/2015 | Hegemann | G01S 13/862 701/33.1 |
| 2015/0206018 A1* | 7/2015 | Cho | G06V 20/582 382/161 |
| 2016/0117562 A1* | 4/2016 | Chung | G06F 18/22 382/104 |
| 2016/0363659 A1* | 12/2016 | Mindell | G01S 5/0247 |
| 2017/0010612 A1* | 1/2017 | Asakura | G08G 1/096783 |
| 2017/0270377 A1* | 9/2017 | Fotta | G06V 20/582 |
| 2018/0089911 A1* | 3/2018 | Rath | G06Q 50/30 |
| 2018/0162409 A1* | 6/2018 | Altman | B60W 50/085 |

(Continued)

*Primary Examiner* — Krishnan Ramesh
(74) *Attorney, Agent, or Firm* — Lorenz & Kopf LLP

(57) ABSTRACT

A vehicle sensor training system includes a first computing device configured to receive dynamics data from a host vehicle. A receiving device is configured to receive real time object identification data from a reference target. A second computing device is configured to compile the dynamics data from the first computing device and the real-time object identification data from the receiving device. The second computing device is configured to train a vehicle sensor with the real-time object identification data.

8 Claims, 3 Drawing Sheets

(56) References Cited

U.S. PATENT DOCUMENTS

2018/0232946 A1\* 8/2018 Jia ........................ G06V 20/182
2020/0111346 A1\* 4/2020 Kodama ............... H04W 4/023

\* cited by examiner

VEHICLE SYSTEM USING VEHICLE-TO-INFRASTRUCTURE AND SENSOR INFORMATION

FIELD

The present disclosure relates to a vehicle system using vehicle-to-infrastructure communication and sensor information and, more particularly, to a vehicle system for identifying traffic signs and signals and their associated phasing and timing.

INTRODUCTION

The statements in this section merely provide background information related to the present disclosure and may not constitute prior art.

Vehicular travel in high traffic areas/times requires driver attention to traffic flow, road conditions, signage, and traffic signals. Autonomous or semi-autonomous control methods, where a vehicle is equipped with devices capable of locating the vehicle with respect to the road and to other traffic on the road, are employed to augment or substitute driver control of the vehicle. Autonomous or semi-autonomous control of a vehicle can reduce operator errors and can provide a driver with time available for personal and work-related activities while en route. Autonomous or semi-autonomous control of a vehicle can also optimize vehicle maneuvering in order to provide reduced traffic congestion, reduced travel time, and improved fuel economy.

In order to improve autonomous or semi-autonomous control of the vehicle, information regarding intersections and signage must be relayed to a vehicle in order for the vehicle to act appropriately (e.g., stop at a red light). However, smart infrastructure systems at each intersection will take time and money to implement.

SUMMARY

A method includes approaching, with a vehicle, first stretch of road having a reference target. Next, data is obtained regarding the first stretch of road from both an onboard vehicle sensor and an infrastructure signal provided about the reference target. The information from the vehicle sensor is compared to the information from the infrastructure signal. Finally, the vehicle sensor is calibrated based on the infrastructure signal.

A vehicle sensor training system includes a first computing device configured to receive dynamics data from a host vehicle. Furthermore, a receiving device is configured to receive real time object identification data from a reference target. Finally, a second computing device is configured to compile the dynamics data from the first computing device and the real time object identification data from the receiving device. The second computing device is configured to train a vehicle sensor with the real time object identification data.

A method includes approaching, with a vehicle, a first stretch of road having a descriptive signage. Next, data is obtained regarding the descriptive signage from both an onboard vehicle sensor and an infrastructure signal provided about the descriptive signage. The information from the vehicle sensor is compared to the information from the infrastructure signal. Finally, the vehicle sensor is trained to identify the descriptive signage when only presented with the information from the vehicle sensor.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
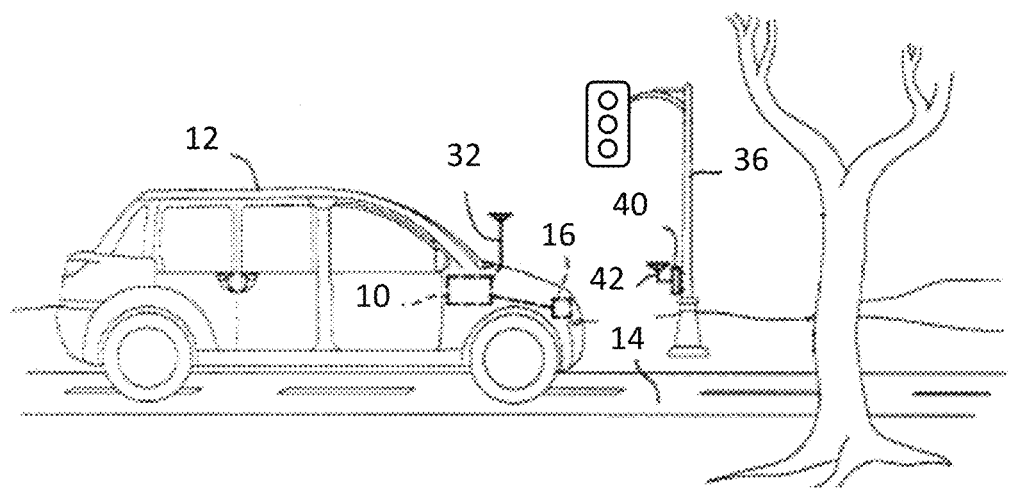
FIG. 1 is a schematic view of an exemplary host vehicle approaching a reference target according to the present disclosure.

The following description is merely exemplary in nature and is not intended to limit the present disclosure, application, or uses. It should be understood that throughout the drawings, corresponding reference numerals indicate like or corresponding parts and features. Further, directions such as "top," "side," "back", "lower," and "upper" are used for purposes of explanation and are not intended to require specific orientations unless otherwise stated. These directions are merely provided as a frame of reference with respect to the examples provided, but could be modified in alternate applications.

Referring now to FIG. 1, an exemplary hardware system 10 for dynamically training a vehicle sensor system to identify traffic signs and signals and their associated phasing and timing and to calibrate the vehicle sensor system within a host vehicle 12 is shown. The host vehicle 12 includes the system 10 onboard as the host vehicle 12 travels along a drive path 14. The system 10 is attachable to and/or integral with the structure of the host vehicle 12.

Figure 2:
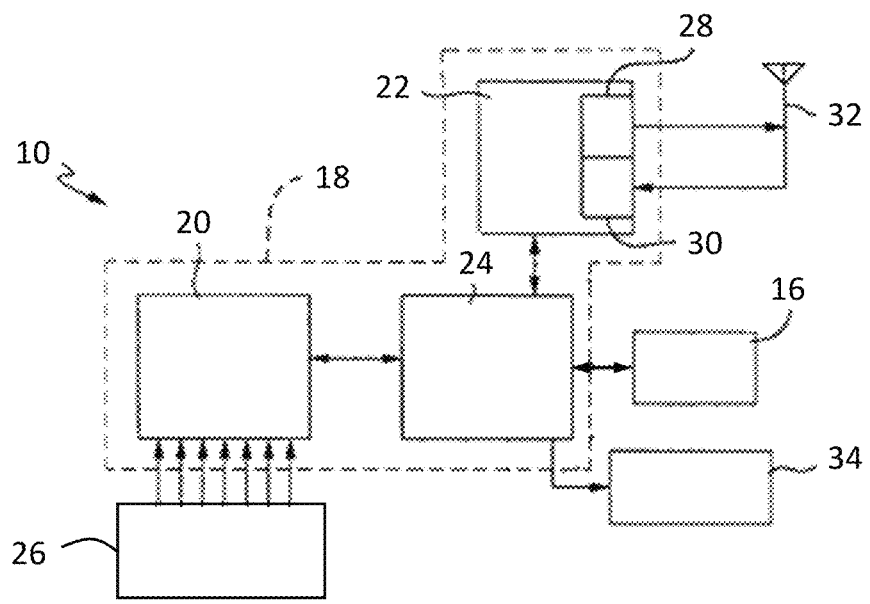
FIG. 2 is a block diagram of a basic hardware system for use with the host vehicle of FIG. 1.

With reference now to FIG. 2, the hardware system 10 includes a vehicle sensor 16 (e.g., a camera based sensor system) and a controller 18. The vehicle sensor 16 is utilized to identify and detect signatory-type objects, traffic signals and their associated phases relative to the vehicle in order to provide the vehicle with information for driving. Although other conventional types of sensors may be used, the sensor 16 is preferably either an electromagnetic radar type sensor, a laser radar type sensor, or merely a pulsed infrared laser type sensor. The sensor 16 is preferably situated at or near the lateral perimeter of the vehicle 12 to thereby facilitate optimal line-of-sight sensing when an object comes close to the vehicle perimeter. Although only one vehicle sensor 16 is illustrated in FIG. 1, it is to be understood that multiple sensors may be situated at various points along the perimeter of the vehicle 12 to thereby facilitate the sensing of an object at approach from any direction.

Further in FIG. 2, the controller 18 includes a first computing device 20, a transmitting/receiving (T/R) device 22, and a second computing device 24. The first computing device 20 is dedicated to processing dynamics data 26 for the vehicle. Such dynamics data 26 may include, for example, real time data concerning the speed level, the acceleration rate, the yaw rate, the steering wheel position, the brake position, the throttle position, and/or the transmission gear position of the vehicle. Such real time data is communicated from various vehicle sensors and/or systems (not shown) to the first computing device 20 via electrical conductor connections.

The T/R device 22 of the controller 18 includes both a transmitter 28 and a receiver 30, which are electrically connected to a directional-type antenna 32. The transmitter 28 and receiver 30 may be a wideband radio-frequency type transmitter/receiver capable of transmitting and receiving, via the antenna 32, electromagnetic radio-frequency (RF) signals over a wide band of signal frequencies. The directional antenna 32 is used for both directing and transmitting an electromagnetic radio-frequency signal to the object and also for receiving a signal from the object. The directional antenna 32 produces a radiation pattern which is directed toward the object. It is to be understood, however, that two separate antennas, one dedicated for directional transmission and one dedicated for receiving, may alternatively be used instead of the single directional antenna 32.

The second computing device 24 of the controller 18 is dedicated to comparing and compiling the values from the first computing device 20 and the T/R device 22 and to predicting traffic signal phasing and timing, when necessary. To facilitate such comparing, compiling, and predicting, the second computing device 24 is electrically connected to the first computing device 20, to both the transmitter 28 and the receiver 30 of the T/R device 22, and to the vehicle sensor 16 via respective electrical conductor connections. The second computing device 24 can, in turn, use the predicted phasing and timing to predict traffic signal timing in absence of V2I information, as will be described in further detail below. Furthermore, the second computing device 24 can also dynamically train the sensor to identify new traffic signs as they are encountered.

Figure 3:
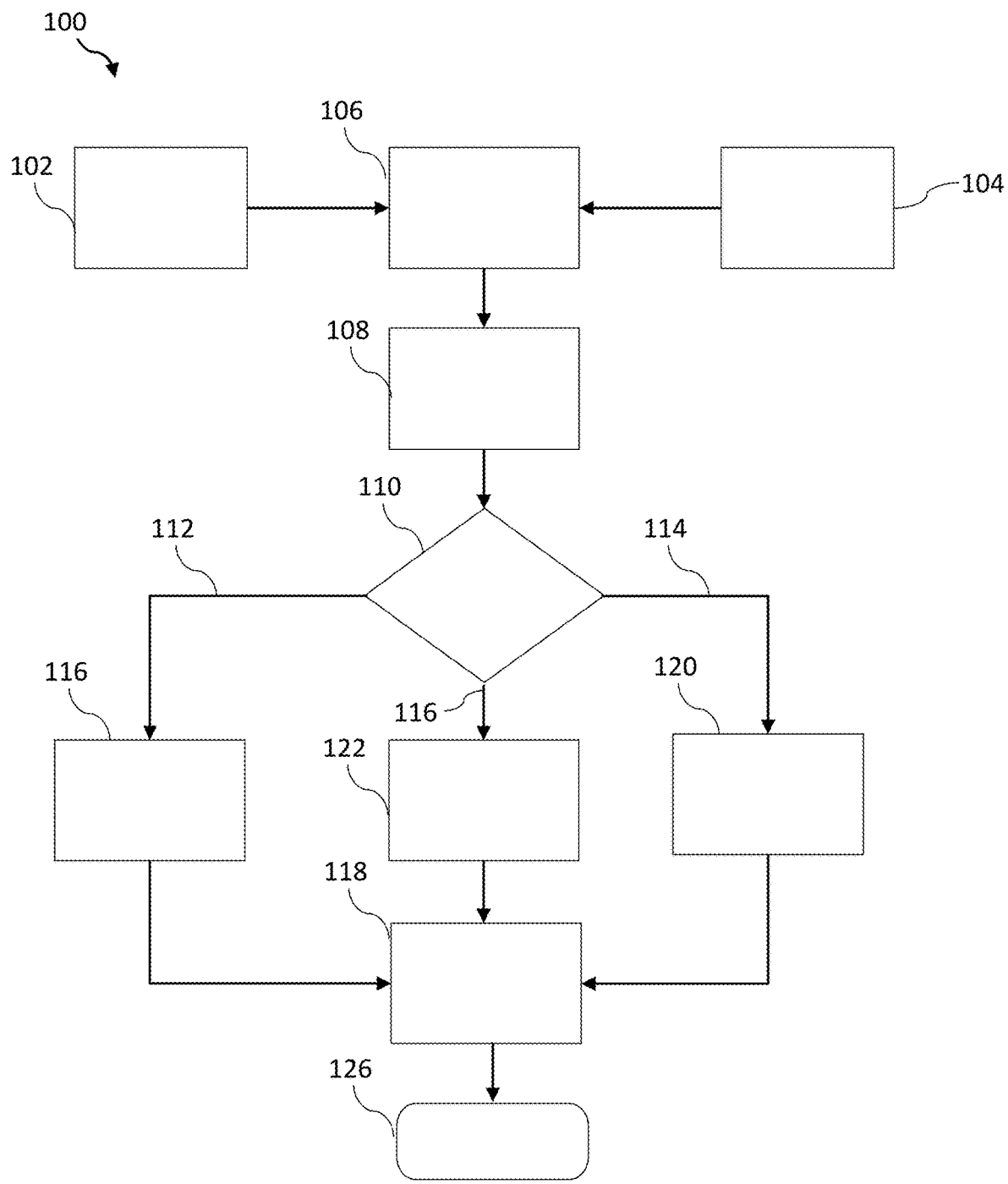
FIG. 3 is a flow diagram of a method for identifying traffic signs and signals and their associated phasing and timing.

With reference to FIG. 3 and continued reference to FIG. 1, the host vehicle 12 may approach and identify reference target objects common to V2I (i.e., vehicle-to-infrastructure) and sensor systems according to an operation 100. The reference target object in this particular case is, for example, a traffic signal post 36, but it should be understood that the reference target object can be any type of signaling target object, such as, stop signs, yield signs, construction signs, etc.

With regard to the traffic signal post 36, an active transponder 40 with an antenna 42 may be situated and mounted on the traffic signal post 36. The transponder 40 is typically a small microprocessor device having a receiver circuit and a transmitter circuit electrically connected to the antenna 42. Except for the antenna 42, the microprocessor device of the transponder 40 is enclosed within a small protective box or container mounted on the traffic signal post 36. Although the microprocessor device may operate with electrical power derived from the same power source used to illuminate the lamp light in the traffic signal post 36, the microprocessor device is preferably powered by rechargeable batteries which are periodically charged with an external energy collector such as, for example, a solar collector. Alternatively, the traffic signal information can be received by other means of communication (e.g., from a cloud-based system).

The operation 100 may begin with either a V2I input initiation (Step 102) or a sensor input initiation (Step 104). With respect to the V2I initiation, the transponder 40 may provide the traffic signal phase and timing information, at a minimum. The transponder 40 may also provide information on road construction, lane closure, reduced speed, curve speed, rail-road crossing, and the like. In particular, the transponder 40 may provide both dynamic and static information for vehicle motion along the drive path 14. This information may be transmitted via the antenna 42 to the host vehicle 12 at the receiver 30 of the T/R device 22. With respect to the sensor initiation, the vehicle sensor 16 may sense the real time position of the reference target (i.e., traffic signal post 36) relative to the host vehicle 12, while concurrently receiving image data related to the type of object being sensed (e.g., traffic light, currently at the red phase). This sensed real time object data is communicated to the second computing device 24 of the controller 18.

In particular, when the host vehicle 12 is following the drive path 14 and approaches the traffic signal post 36 such that the traffic signal post 36 comes within a predetermined sensing range (for example, 20 meters) of the antenna 32 onboard the host vehicle 12, the antenna 32 will receive the information transmitted from the transponder 40. This information will be relayed from the T/R device 22 to the second computing device 24. At generally the same time, relevant real time vehicle dynamics data 26 from the first computing device 20 is communicated to the second computing device 24, as well. Furthermore, the vehicle sensor 16 onboard the host vehicle 12 will sense the relative location of the reference target relative to the host vehicle 12 and communicate relative object position data to the second computing device 24 of the controller 18.

Using both the real time object position data (i.e., from the transponder 40), the real time vehicle dynamics data 26, and the relative object type and position data (i.e., from the vehicle sensor 16), the second computing device 24 then identifies the most relevant traffic signal and sign information in Step 108. In particular, the system prioritizes information being received by various methods (e.g., signs in closer proximity are prioritized higher, signs for safety are prioritized above those of convenience). Furthermore, in Step 110, the second computing device 24 compares the data received and determines what type of data is present (e.g., V2I only 112, sensor only 114, V2I input and the sensor input data 116).

In situations where the second computing device 24 identifies that V2I only 112 information is available (e.g., sensor has failed or was obstructed), the operation 100 moves to Step 116 and reviews the V2I only data before moving to a relevant safety application in Step 118. The safety application may include notifying the driver about imminent traffic conditions, stopping the vehicle, alerting nearby vehicles or pedestrians to a situation. The V2I only operation gathers the communicated V2I information for enhancing the system, such as signal timing and intersection description.

In situations where the second computing device 24 identifies that sensor only 114 information is available (e.g., intersection is not equipped with V2I), the operation 100 moves to Step 120 and uses available additional data to map the intersection before moving to the relevant safety application in Step 118. As an example, the system may utilize map data (road and intersection geometry) from V2I information provided by neighboring V2I equipped intersections, from a cloud-based system, or may utilize heuristics and prior travel data from frequent routes to provide improved signal information. At such intersections, the vehicle sensor 16 may detect signal phase using only the sensor information and may predict signal timing using information received at previous V2I equipped intersections, the cloud-based system, or heuristics and prior travel data. The previously received information may contain a localized map to better detect stop bars and traffic signals at nearby intersections and improve signal timing predictions.

If, however, both V2I input and the sensor input data 116 is available, the operation 100 moves to Step 122 and combines the V2I and sensor information to calibrate and train the sensor. In particular, when the combination function is initiated, various inputs are sent to the second computing device 24 in order to use actual signal phase and timing information to calibrate the vehicle sensor 216. The information provided may also include signal timing and intersection descriptions for non-V2I equipped intersections within the vicinity, as described above. Again, the relevant safety application is then initiated in Step 118 and the process is ended. This combination function of the V2I and sensor information allows for detection of traffic signals and signs at higher speeds and distances, and in low visibility conditions.

In addition to the particular exemplary scenario described hereinabove with regard to FIG. 1, it is to be understood that any reference target having any suitable type of conventional transponder, either active or passive, or conventional reflector may be situated on a particular object and thereby serve as a means for identifying the object to a host vehicle pursuant to the present invention.

Figure 4:
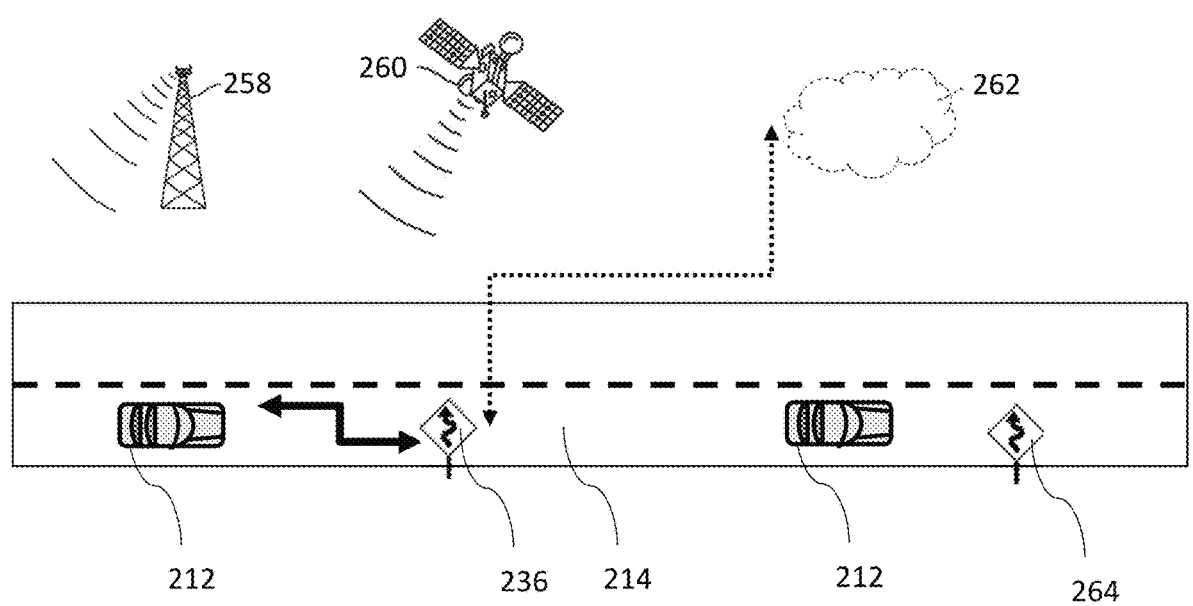
FIG. 4 is another schematic view of an exemplary host vehicle approaching a reference target according to the present disclosure.

Furthermore, and as a secondary example described with respect to FIG. 4, a host vehicle 212 may travel along a drive path 214 towards a stationary reference object (e.g., curved road sign 236). The curved road sign 236 may be a sign that the vehicle has not yet encountered and is not yet previously programmed into the vehicle systems. As such, the vehicle sensor 216 may detect the new traffic sign and use V2I messaging or another method (e.g., via V2I communications devices located on other vehicles (not shown), a remote wireless communications system 258, a remote satellite system 260, and/or a cloud-based computing system 262) to train the sensor system as to the meaning and treatment of the sign. This information may be stored onboard the vehicle 212 or may be communicated to another external source. Once stored, the sign may be understood upon a subsequent encounter with another similar sign (e.g., sign 264. This onboard training for new signs allows for region-based learning with minimal pre-storing of information related to signage. This is especially important in regions that do not allow connectivity due to privacy concerns.

Embodiments of the present disclosure are described herein. This description is merely exemplary in nature and, thus, variations that do not depart from the gist of the disclosure are intended to be within the scope of the disclosure. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for various applications. Various combinations and modifications of the features consistent with the teachings of this disclosure, however, could be desired for particular applications or implementations.

What is claimed is:

1. A vehicle sensor training system for a host vehicle, comprising:
 a controller comprising:
  a first computing device configured to, by a processor, receive dynamics data from a vehicle sensor of the host vehicle, wherein the vehicle sensor senses dynamics of the host vehicle;
  a receiving device configured to, by the processor, receive real time object identification data from a reference target, wherein the reference target includes a traffic signaling object comprising a transponder; and
  a second computing device configured to, by the processor, compile the dynamics data from the first computing device and the real-time object identification data from the receiving device, and train a second vehicle sensor system based on the compiled dynamics data and real time object identification data as to a meaning and a response by the host vehicle to the traffic signaling object,
  wherein the second computing device further determines if the data from the first computing device and the receiving device correspond to a same object, and
  wherein the second computing device identifies priority between the dynamics data and the real-time object identification data when the vehicle dynamics data corresponds to a different object from that of the receiving device.

2. The vehicle sensor training system of claim 1, wherein the dynamics data includes one of a vehicle yaw rate, a vehicle steering wheel position, a vehicle brake position, a vehicle throttle position, and a vehicle transmission gear position.

3. The vehicle sensor training system of claim 1, wherein the receiving device is interconnected with an antenna configured to receive an electromagnetic radio-frequency signal from the transponder of the reference target.

4. The vehicle sensor training system of claim 3, wherein the electromagnetic radio-frequency signal includes at least the real-time object identification data.

5. The vehicle sensor training system of claim 1, wherein the second computing device outputs a predicted phase and timing for one or more upcoming traffic lights based on the vehicle sensor.

6. The vehicle sensor training system of claim 1, wherein the second computing device outputs a predicted sign type for one more upcoming traffic signs based on the vehicle sensor.

7. The vehicle sensor training system of claim 1, wherein the second computing device selectively calibrates the vehicle sensor based on an availability of the dynamics data and the real time object identification data.

8. A vehicle comprising the vehicle sensor training system of claim 1.

* * * * *